United States Patent
Zhou et al.

(10) Patent No.: US 10,082,904 B2
(45) Date of Patent: Sep. 25, 2018

(54) TERMINAL, AND TERMINAL CONTROL APPARATUS AND METHOD

(71) Applicant: Huawei Technologies Co., Ltd., Shenzhen (CN)

(72) Inventors: Jin Zhou, Shanghai (CN); Hang Li, Shenzhen (CN); Bing Liu, Shenzhen (CN); Yifei Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/447,952

(22) Filed: Mar. 2, 2017

(65) Prior Publication Data

US 2017/0177155 A1 Jun. 22, 2017

Related U.S. Application Data

(63) Continuation of application No. PCT/CN2014/085814, filed on Sep. 3, 2014.

(51) Int. Cl.
*G06F 3/041* (2006.01)
*G06F 3/044* (2006.01)
(Continued)

(52) U.S. Cl.
CPC .......... *G06F 3/0416* (2013.01); *G06F 3/044* (2013.01); *H04M 1/02* (2013.01); *G06F 3/0227* (2013.01)

(58) Field of Classification Search
CPC ...... G06F 3/0416; G06F 3/044; G06F 3/0227; H04M 1/02
See application file for complete search history.

(56) References Cited

U.S. PATENT DOCUMENTS

2007/0257890 A1 11/2007 Hotelling et al.
2009/0315838 A1 12/2009 Geiger
(Continued)

FOREIGN PATENT DOCUMENTS

CN 101916502 A 12/2010
CN 101957699 A 1/2011
(Continued)

OTHER PUBLICATIONS

Machine Translation and Abstract of Chinese Publication No. CN101916502, Dec. 15, 2010, 8 pages.
(Continued)

*Primary Examiner* — Abhishek Sarma
(74) *Attorney, Agent, or Firm* — Conley Rose, P.C.

(57) ABSTRACT

A system comprises a touchscreen, at least one touch control unit, a first controller, and a second controller, where the touch control unit includes a detection electrode, an induction electrode, and a conducting wire that connects the detection electrode and the induction electrode, where the detection electrode is located outside a touch control area of the touchscreen, the induction electrode is located in the touch control area of the touchscreen, and the induction electrode is coupled to at least one capacitance node in the touchscreen, and the first controller is separately connected to the touchscreen and the second controller. A touch control operation performed by a user on the detection electrode disposed outside the touchscreen is identified using an existing capacitance node in the touchscreen, and the terminal is controlled according to the touch control operation.

14 Claims, 4 Drawing Sheets

(51) Int. Cl.
*H04M 1/02* (2006.01)
*G06F 3/02* (2006.01)

(56) References Cited

U.S. PATENT DOCUMENTS

| | | |
|---|---|---|
| 2013/0127762 A1 | 5/2013 | Tong |
| 2013/0169598 A1 | 7/2013 | Kitamori et al. |
| 2014/0210776 A1 | 7/2014 | Kuroiwa et al. |
| 2015/0103267 A1 | 4/2015 | Zhang et al. |

FOREIGN PATENT DOCUMENTS

| | | | |
|---|---|---|---|
| CN | 101989162 | A | 3/2011 |
| CN | 102221945 | A | 10/2011 |
| CN | 103258171 | A | 8/2013 |
| CN | 103500044 | A | 1/2014 |
| CN | 103838454 | A | 6/2014 |
| CN | 103973288 | A | 8/2014 |
| CN | 103984455 | A | 8/2014 |
| CN | 103984456 | A | 8/2014 |
| JP | 2003022161 | A | 1/2003 |
| JP | 2013532877 | A | 8/2013 |
| JP | 2013219610 | A | 10/2013 |
| JP | 2014146092 | A | 8/2014 |
| WO | 0159558 | A1 | 8/2001 |
| WO | 2008045414 | A1 | 4/2008 |
| WO | 2012073577 | A1 | 6/2012 |

OTHER PUBLICATIONS

Machine Translation and Abstract of Chinese Publication No. CN103973288, Aug. 6, 2014, 39 pages.
Foreign Communication From a Counterpart Application, Chinese Application No. 201480046228.2, Chinese Office Action dated Feb. 27, 2018, 8 pages.
Machine Translation and Abstract of Japanese Publication No. JP2003022161, Jan. 24, 2003, 17 pages.
Machine Translation and Abstract of Japanese Publication No. JP2013219610, Oct. 24, 2013, 21 pages.
Foreign Communication From a Counterpart Application, Japanese Application No. 2017-512356, Japanese Office Action dated Dec. 12, 2017, 5 pages.
Foreign Communication From a Counterpart Application, Japanese Application No. 2017-512356, English Translation of Japanese Office Action dated Dec. 12, 2017, 6 pages.
Machine Translation and Abstract of Chinese Publication No. CN103838454, Jun. 4, 2014, 18 pages.
Machine Translation and Abstract of Chinese Publication No. CN103984455, Aug. 13, 2014, 10 pages.
Foreign Communication From a Counterpart Application, European Application No. 14901266.8, Extended European Search Report dated Aug. 9, 2017, 9 pages.
Foreign Communication From a Counterpart Application, PCT Application No. PCT/CN2014/085814, English Translation of International Search Report dated May 26, 2015, 2 pages.
Foreign Communication From a Counterpart Application, PCT Application No. PCT/CN2014/085814, English Translation of Written Opinion dated May 26, 2015, 6 pages.

TERMINAL, AND TERMINAL CONTROL APPARATUS AND METHOD

CROSS-REFERENCE TO RELATED APPLICATIONS

This application is a continuation of International Application No. PCT/CN2014/085814, filed on Sep. 3, 2014, the disclosure of which is hereby incorporated by reference in its entirety.

TECHNICAL FIELD

The present disclosure relates to the terminal control field, and in particular, to a terminal, and a terminal control apparatus and method.

BACKGROUND

With continuous development of electronic technologies, a terminal, such as a smartphone, a tablet computer, and an electronic book (eBook) reader, that includes a touchscreen is increasingly popular.

When a user performs a touch operation on the touchscreen to control the terminal, a finger of the user is prone to obstruct content displayed on the touchscreen. To minimize an obstruction of the screen caused by the touch operation by the user, for an existing terminal, independent touch keys are usually disposed outside the touchscreen of the terminal, and these touch keys are correspondingly set as commonly-used function keys such as a menu key, a return key, and a home key. With a structure similar to the touchscreen, the touch keys may include a complete capacitance node, and the capacitance node may include two layers of conductors that are insulated from each other. When the user touches the touch key, a charge transfer occurs between an upper-layer conductor of the capacitance node and the finger, accordingly, a capacitance of the capacitance node changes, and the terminal may detect, according to the change of the capacitance, that the user performs a touch control operation on the touch key, and then perform a function instruction corresponding to the touch key.

The existing touch keys disposed outside the touchscreen are independent touch detection components that need to occupy a given space of a terminal. Therefore, a relatively small quantity of touch keys are usually disposed, and corresponding functions are limited, which causes poor user experience.

SUMMARY

To resolve the problem of a poor user experience due to that a relatively small quantity of touch keys are generally disposed, and have limited corresponding functions because the touch keys disposed outside a touchscreen are independent touch detection components that need to occupy a given space of a terminal, embodiments of the present disclosure provide a terminal, and a terminal control apparatus and method.

A first aspect provides a terminal, and the terminal includes a touchscreen, at least one touch control unit, a first controller, and a second controller, where the touch control unit includes a detection electrode, an induction electrode, and a conducting wire that connects the detection electrode and the induction electrode, where the detection electrode is located outside a touch control area of the touchscreen, the induction electrode is located in the touch control area of the touchscreen, and the induction electrode is coupled to at least one capacitance node in the touchscreen, and the first controller is separately connected to the touchscreen and the second controller.

In a first possible implementation manner of the first aspect, the at least one touch control unit is disposed in a screen protector, where the screen protector is attached to an upper surface of the touchscreen, or the at least one touch control unit is disposed in the touchscreen.

With reference to the first aspect or the first possible implementation manner of the first aspect, in a second possible implementation manner of the first aspect, the first controller is configured to when detecting, according to a capacitance change parameter of the at least one capacitance node and a capacitance change parameter of a node neighboring to the at least one capacitance node, that the detection electrode receives a touch control operation, generate a touch control event that is used to indicate the touch control operation, and send the touch control event to the second controller, where the capacitance change parameter is used to indicate a capacitance change value of a corresponding capacitance node for a time period, and the second controller is configured to receive the touch control event, obtain a control instruction corresponding to the touch control event, and control the terminal according to the control instruction.

With reference to the second possible implementation manner of the first aspect, in a third possible implementation manner of the first aspect, the second controller is configured to query a first correspondence between the touch control event and a function key instruction, and obtain the function key instruction and use the function key instruction as the control instruction.

With reference to the second possible implementation manner of the first aspect, in a fourth possible implementation manner of the first aspect, the second controller is configured to query an application program according to a second correspondence between the touch control event and the application program, and obtain an instruction for starting the application program and use the instruction as the control instruction.

With reference to the fourth possible implementation manner of the first aspect, in a fifth possible implementation manner of the first aspect, the second controller is configured to before querying the application program according to the second correspondence between the touch control event and the application program, query identifiers of application programs on the terminal, display the queried identifiers of the application programs as an application program identifier list, and establish the second correspondence according to an operation that is selected by a user from the application program identifier list.

With reference to the second possible implementation manner of the first aspect, in a sixth possible implementation manner of the first aspect, the second controller is configured to query an application user interface that currently runs at an uppermost layer on the terminal, and detect whether the application user interface corresponds to a third correspondence, where the third correspondence is a correspondence between the touch control event and a control instruction corresponding to the application user interface, and the second controller is configured to obtain the control instruction according to the touch control event and the third correspondence if a detection result is that the application user interface corresponds to the third correspondence.

With reference to the sixth possible implementation manner of the first aspect, in a seventh possible implementation manner of the first aspect, the second controller is configured to before obtaining the control instruction according to the touch control event and the third correspondence, query identifiers of control instructions corresponding to the application user interface, display the queried identifiers of the control instructions as a control instruction identifier list, and establish the third correspondence according to an operation that is selected by a user from the control instruction identifier list.

A second aspect provides a terminal control apparatus that is applied to a terminal that includes a touchscreen and at least one touch control unit, where the touch control unit includes a detection electrode, an induction electrode, and a conducting wire that connects the detection electrode and the induction electrode, where the detection electrode is located outside a touch control area of the touchscreen, the induction electrode is located in the touch control area of the touchscreen, and the induction electrode is coupled to at least one capacitance node in the touchscreen, where the apparatus includes a generating module configured to when detecting, according to a capacitance change parameter of the at least one capacitance node and a capacitance change parameter of a node neighboring to the at least one capacitance node, that the detection electrode receives a touch control operation, generate a touch control event that is used to indicate the touch control operation, where the capacitance change parameter is used to indicate a capacitance change value of a corresponding capacitance node for a time period, an obtaining module configured to obtain a control instruction corresponding to the touch control event, and a control module configured to control the terminal according to the control instruction.

In a first possible implementation manner of the second aspect, the obtaining module includes a first querying unit configured to query a first correspondence between the touch control event and a function key instruction, and a first obtaining unit configured to obtain the function key instruction and use the function key instruction as the control instruction.

In a second possible implementation manner of the first aspect, the obtaining module includes a second querying unit configured to query an application program according to a second correspondence between the touch control event and the application program, and a second obtaining unit configured to obtain an instruction for starting the application program and use the instruction as the control instruction.

With reference to the second possible implementation manner of the first aspect, in a third possible implementation manner of the first aspect, the controller includes a first querying module configured to query identifiers of application programs on the terminal before the second querying unit queries the application program according to the second correspondence between the touch control event and the application program, a first display module configured to display, as an application program identifier list, the identifiers that are of the application programs and queried by the first querying module, and a first establishing module configured to establish the second correspondence according to an operation that is selected by a user from the application program identifier list.

In a fourth possible implementation manner of the first aspect, the obtaining module includes a third querying unit configured to query an application user interface that currently runs at an uppermost layer on the terminal, a detection unit configured to detect whether the application user interface corresponds to a third correspondence, where the third correspondence is a correspondence between the touch control event and a control instruction corresponding to the application user interface, and a third obtaining unit configured to obtain the control instruction according to the touch control event and the third correspondence if a detection result of the detection unit is that the application user interface corresponds to the third correspondence.

With reference to the fourth possible implementation manner of the first aspect, in a fifth possible implementation manner of the first aspect, the controller includes a second querying module configured to query identifiers of control instructions corresponding to the application user interface before the third obtaining unit obtains the control instruction according to the touch control event and the third correspondence, a second display module configured to display, as a control instruction identifier list, the identifiers that are of the control instructions and queried by the second querying module, and a second establishing module configured to establish the third correspondence according to an operation that is selected by a user from the control instruction identifier list.

A third aspect provides a terminal control method that is applied to a terminal that includes a touchscreen and at least one touch control unit, where the touch control unit includes a detection electrode, an induction electrode, and a conducting wire that connects the detection electrode and the induction electrode, where the detection electrode is located outside a touch control area of the touchscreen, the induction electrode is located in the touch control area of the touchscreen, and the induction electrode is coupled to at least one capacitance node in the touchscreen, where the method includes when detecting, according to a capacitance change parameter of the at least one capacitance node and a capacitance change parameter of a node neighboring to the at least one capacitance node, that the detection electrode receives a touch control operation, generating, by the terminal, a touch control event that is used to indicate the touch control operation, where the capacitance change parameter is used to indicate a capacitance change value of a corresponding capacitance node for a time period, obtaining, by the terminal, a control instruction corresponding to the touch control event, and controlling, by the terminal, the terminal according to the control instruction.

In a first possible implementation manner of the third aspect, the obtaining, by the terminal, a control instruction corresponding to the touch control event includes querying a first correspondence between the touch control event and a function key instruction, and obtaining the function key instruction and using the function key instruction as the control instruction.

In a second possible implementation manner of the third aspect, the obtaining, by the terminal, a control instruction corresponding to the touch control event includes querying an application program according to a second correspondence between the touch control event and the application program, and obtaining an instruction for starting the application program and using the instruction as the control instruction.

With reference to the second possible implementation manner of the third aspect, in a third possible implementation manner of the third aspect, before the querying an application program according to a second correspondence between the touch control event and the application program, the method further includes querying, by the terminal, identifiers of application programs on the terminal, displaying, by the terminal, the queried identifiers of the application programs as an application program identifier list, and establishing, by the terminal, the second correspondence according to an operation that is selected by a user from the application program identifier list.

In a fourth possible implementation manner of the third aspect, the obtaining, by the terminal, a control instruction corresponding to the touch control event includes querying an application user interface that currently runs at an uppermost layer on the terminal, detecting whether the application user interface corresponds to a third correspondence, where the third correspondence is a correspondence between the touch control event and a control instruction corresponding to the application user interface, and obtaining the control instruction according to the touch control event and the third correspondence if a detection result is that the application user interface corresponds to the third correspondence.

With reference to the fourth possible implementation manner of the third aspect, in a fifth possible implementation manner of the third aspect, before the obtaining the control instruction according to the touch control event and the third correspondence, the method further includes querying, by the terminal, identifiers of control instructions corresponding to the application user interface, displaying, by the terminal, the queried identifiers of the control instructions as a control instruction identifier list, and establishing, by the terminal, the third correspondence according to an operation that is selected by a user from the control instruction identifier list.

The technical solution provided in the embodiments of the present disclosure provides several beneficial effects.

A detection electrode is disposed outside a touch control area of a touchscreen of a terminal, an induction electrode is disposed in the touch area, and the detection electrode is connected to the induction electrode using a conducting wire. When a user performs an operation on the detection electrode, a capacitance change value of a capacitance node coupled to the induction electrode changes. Therefore, a first controller detects, according to a capacitance change of the capacitance node coupled to the induction electrode, that the detection electrode receives a touch control operation, and generates a corresponding touch control event, a second controller controls the terminal according to the touch control event. The touch control operation performed by the user on the detection electrode disposed outside the touchscreen is identified using an existing capacitance node in the touchscreen, and the terminal is controlled according to the touch control operation. Therefore, by merely occupying a very small space and spending very low costs, a manner in which a user controls a terminal may be further extended, and user experience may be improved.

BRIEF DESCRIPTION OF DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

To make the objectives, technical solutions, and advantages of the present disclosure clearer, the following further describes the embodiments of the present disclosure in detail with reference to the accompanying drawings.

Figure 1:
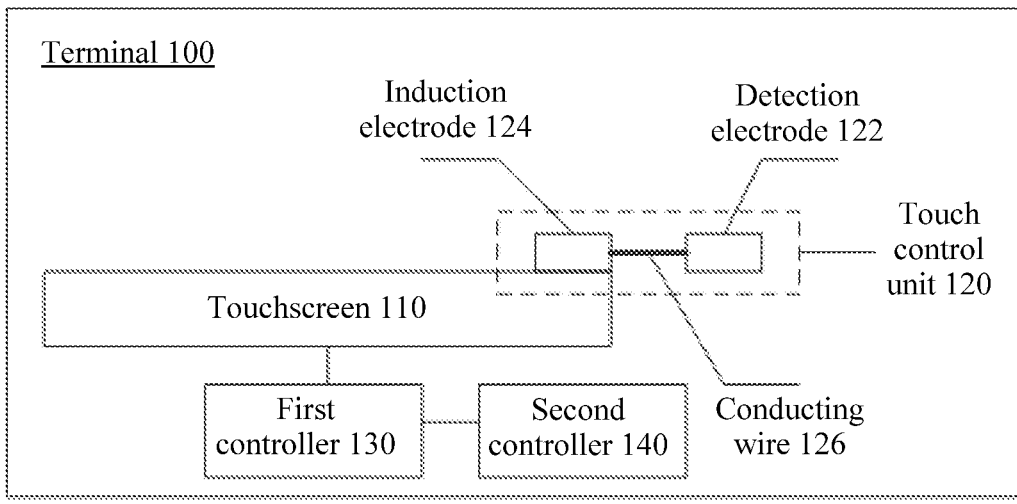
FIG. 1 is a schematic structural diagram of a terminal according to an embodiment of the present disclosure.

FIG. 1 shows a schematic structural diagram of a terminal according to an embodiment of the present disclosure. The terminal 100 may include a touchscreen 110, at least one touch control unit 120, a first controller 130, and a second controller 140.

The touch control unit 120 includes a detection electrode 122, an induction electrode 124, and a conducting wire 126 that connects the detection electrode 122 and the induction electrode 124.

The detection electrode 122 is located outside a touch control area of the touchscreen 110, the induction electrode 124 is located in the touch control area of the touchscreen 110, and the induction electrode 124 is coupled to at least one capacitance node in the touchscreen 110.

The first controller 130 is separately connected to the touchscreen 110 and the second controller 140.

The first controller 130 is configured to when detecting, according to a capacitance change parameter of the at least one capacitance node and a capacitance change parameter of a node neighboring to the at least one capacitance node, that the detection electrode 122 receives a touch control operation, generate a touch control event that is used to indicate the touch control operation, where the capacitance change parameter is used to indicate a capacitance change value of a corresponding capacitance node for a time period.

The second controller 140 is configured to receive the touch control event, obtain a control instruction corresponding to the touch control event, and control the terminal according to the control instruction.

The first controller 130 may be a touchscreen controller in the terminal, and the second controller 140 may be a central processing unit in the terminal.

Both the detection electrode and the induction election are made of conducting materials. When a user performs a touch operation on the detection electrode outside the touchscreen, a charge transfer occurs in the detection electrode, and accordingly, a charge transfer occurs in the induction electrode. When the charge transfer occurs in the induction electrode, a capacitance change value of the capacitance node that is coupled to the induction electrode and in the touchscreen also changes. The first controller (the touchscreen controller) connected to the touchscreen scans capacitance change values of all capacitance nodes in the touchscreen, and when detecting that the capacitance node coupled to the induction node changes, the first controller may determine, according to the capacitance change value of the capacitance node coupled to the induction node, the capacitance change value of the capacitance node neighboring to the capacitance node coupled to the induction node, and locations of these capacitance nodes, whether the capacitance changes of these capacitance nodes are capacitance changes caused by touching the detection electrode by the user or capacitance changes caused by touching the touchscreen by the user. If the first controller determines that the capacitance changes of these capacitance nodes are the capacitance changes caused by touching the detection electrode by the user, the first controller generates the touch control event corresponding to the touch control operation performed by the user on the detection electrode, and the second controller (the central processing unit) may query, according to the touch control event generated by the first controller, the control instruction corresponding to the operation performed by the user, and control the terminal according to the queried control instruction.

It should be noted that in this embodiment of the present disclosure, a touch control event that is generated when the first controller detects that the user touches and controls the detection electrode is different from a touch control event generated when the user performs a touch control operation on the touch control area in which the induction electrode is located, that is, the detection electrode is an independent touch key and corresponds to a control instruction, which is unrelated to content displayed in the area, in the touchscreen, in which the induction electrode is located.

In conclusion, according to the terminal provided in this embodiment of the present disclosure, a detection electrode is disposed outside a touch control area of a touchscreen of the terminal, an induction electrode is disposed in the touch area, and the detection electrode is connected to the induction electrode using a conducting wire. When a user performs an operation on the detection electrode, a capacitance change value of a capacitance node coupled to the induction electrode changes. Therefore, a first controller detects, according to a capacitance change of the capacitance node coupled to the induction electrode, that the detection electrode receives a touch control operation, and generates a corresponding touch control event, a second controller controls the terminal according to the touch control event. The touch control operation performed by the user on the detection electrode disposed outside the touchscreen is identified using an existing capacitance node in the touchscreen, and the terminal is controlled according to the touch control operation. Therefore, by merely occupying a very small space and spending very low costs, a manner in which a user controls a terminal may be further extended, and user experience may be improved.

Figure 2:
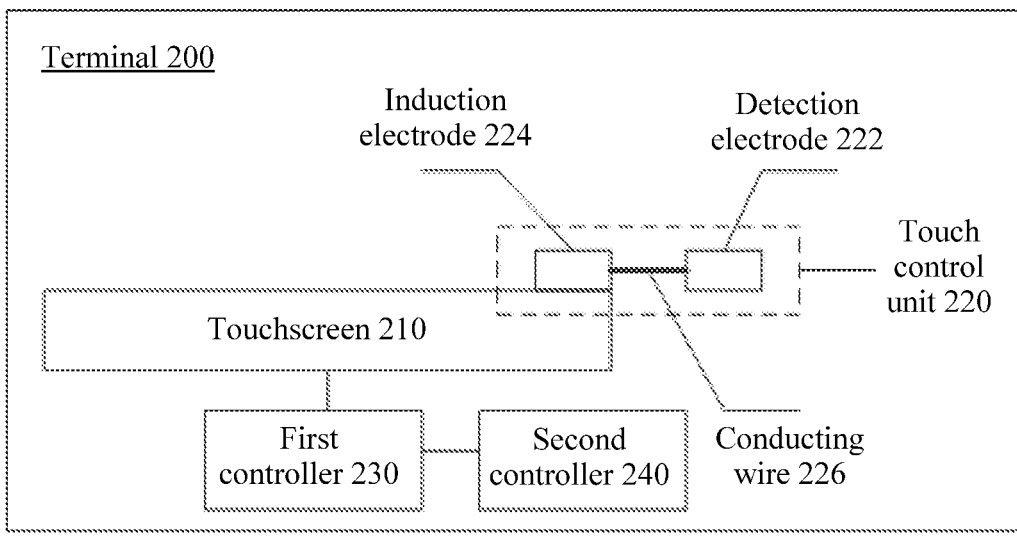
FIG. 2 is a schematic structural diagram of a terminal according to another embodiment of the present disclosure.

To further describe the terminal shown in the foregoing FIG. 1, refer to FIG. 2, which shows a schematic structural diagram of a terminal according to another embodiment of the present disclosure. The terminal 200 may include a touchscreen 210, at least one touch control unit 220, a first controller 230, and a second controller 240.

The touch control unit 220 includes a detection electrode 222, an induction electrode 224, and a conducting wire 226 that connects the detection electrode 222 and the induction electrode 224.

The detection electrode 222 is located outside a touch control area of the touchscreen 210, the induction electrode 224 is located in the touch control area of the touchscreen 210, and the induction electrode 224 is coupled to at least one capacitance node in the touchscreen 210.

The first controller 230 is separately connected to the touchscreen 210 and the second controller 240.

The first controller 230 is configured to when detecting, according to a capacitance change parameter of the at least one capacitance node and a capacitance change parameter of a node neighboring to the at least one capacitance node, that the detection electrode 222 receives a touch control operation, generate a touch control event that is used to indicate the touch control operation, where the capacitance change parameter is used to indicate a capacitance change value of a corresponding capacitance node for a time period.

The second controller 240 is configured to receive the touch control event, obtain a control instruction corresponding to the touch control event, and control the terminal according to the control instruction.

The first controller 230 may be a touchscreen controller in the terminal, and the second controller 240 may be a central processing unit in the terminal.

Both the detection electrode and the induction election are made of conducting materials. When a user performs a touch operation on the detection electrode outside the touchscreen, a charge transfer occurs in the detection electrode, and accordingly, a charge transfer occurs in the induction electrode. When the charge transfer occurs in the induction electrode, a capacitance change value of the capacitance node that is coupled to the induction electrode and in the touchscreen also changes. The first controller connected to the touchscreen scans capacitance change values of all capacitance nodes in the touchscreen, and when detecting that the capacitance node coupled to the induction node changes, the first controller may determine, according to the capacitance change value of the capacitance node coupled to the induction node, the capacitance change value of the capacitance node neighboring to the capacitance node coupled to the induction node, and locations of these capacitance nodes, whether the capacitance changes of these capacitance nodes are capacitance changes caused by touching the detection electrode by the user or capacitance changes caused by touching the touchscreen by the user. If the first controller determines that the capacitance changes of these capacitance nodes are the capacitance changes caused by touching the detection electrode by the user, the first controller generates the touch control event corresponding to the touch control operation performed by the user on the detection electrode, and the second controller may query, according to the touch control event generated by the first controller, the control instruction corresponding to the operation performed by the user, and control the terminal according to the queried control instruction.

It should be noted that in this embodiment of the present disclosure, a touch control event that is generated when the first controller detects that the user touches and controls the detection electrode is different from a touch control event generated when the user performs a touch control operation on the touch control area in which the induction electrode is located, that is, the detection electrode is an independent touch key and corresponds to a control instruction, which is unrelated to content displayed in the area, in the touchscreen, in which the induction electrode is located.

Further, the at least one touch control unit 220 is disposed in a screen protector, where the screen protector is attached to an upper surface of the touchscreen.

Alternatively, the at least one touch control unit 220 may be disposed in the touchscreen 210.

The touch control unit may be directly disposed in the screen protector attached to the upper surface of the touchscreen. For example, the touch control unit may be disposed on an upper surface or a lower surface of the screen protector, or inside the screen protector provided that the induction electrode in the touch control unit is insulated from and coupled to the capacitance node in the touchscreen.

Alternatively, the touch control unit may be directly disposed in the touchscreen of the terminal. For example, the touch control unit may be disposed on an upper surface or a lower surface of the touchscreen, or inside the touchscreen provided that the induction electrode in the touch control unit is insulated from and coupled to the capacitance node in the touchscreen.

Optionally, when obtaining the control instruction corresponding to the touch control event, the second controller 240 is configured to query a first correspondence between the touch control event and a function key instruction, and obtain the function key instruction and use the function key instruction as the control instruction.

When receiving the touch control event generated when the touch control operation is performed on the detection electrode, the central processing unit of the terminal first determines whether the terminal stores the first correspondence between the touch control event and the function key instruction, and obtains the function key instruction and uses the function key instruction as the control instruction if the terminal stores the first correspondence, or discards the touch control event if the terminal does not store the first correspondence.

A function key is a key in a navigation bar at a terminal user interface. In an example in which the terminal is a smartphone, keys in the navigation bar may be a return key, a menu key, a home key, and the like that are at various user interfaces.

A developer may preset the first correspondence between touch control events corresponding to touch control units in the terminal and control instructions (such as an instruction for returning to a previous user interface, an instruction for calling out a menu bar, and an instruction for returning to a main user interface) corresponding to the keys in the navigation bar. After generating the touch control event corresponding to the touch control operation performed by the user on the detection electrode, the touchscreen controller sends the touch control event to the central processing unit, and the central processing unit queries the corresponding control instruction according to the first correspondence and the touch control event.

Optionally, when obtaining the control instruction corresponding to the touch control event, the second controller 240 may be further configured to query an application program according to a second correspondence between the touch control event and the application program, and obtain an instruction for starting the application program and use the instruction as the control instruction.

Further, the second controller 240 is further configured to before querying the application program according to the second correspondence between the touch control event and the application program, query identifiers of application programs on the terminal, display the queried identifiers of the application programs as an application program identifier list, and establish the second correspondence according to an operation that is selected by the user from the application program identifier list.

In this embodiment of the present disclosure, the detection electrode in the terminal may be further configured to start a specific application program. When receiving the touch control event corresponding to the detection electrode, the central processing unit may determine whether the terminal stores the second correspondence between the touch control event and the application program, and query, according to the second correspondence, the application program corresponding to the touch control event if the terminal stores the second correspondence, and obtain the instruction for starting the application program, or may discard the touch control event if the terminal does not store the second correspondence, or may trigger a step of defining a second correspondence by the user, query application programs on the terminal, and display the application programs to the user such that the user selects an application program and establishes the second correspondence between the application program and the touch control event.

For example, when the terminal is a smartphone with an ANDROID system, when detecting that the detection electrode in the touch control unit is tapped, the touchscreen controller generates a touch control event including a serial number of a key (such as key 1) corresponding to the touch control unit. After receiving the touch control event, the central processing unit writes the serial number of the key into a register and reports an interruption. When receiving the interruption, a driver layer reads the register, changes a read key value (key 1) to a key event, and reports the key event to a Framework layer. After receiving the key event, the Framework layer sends the key event to a strategy control service. The strategy control service determines, according to the second correspondence, a to-be-started application program, obtains an instruction for starting the application program and uses the instruction as the control instruction, and implements the control instruction.

The second correspondence may be established by means of user definition. When the strategy control service queries the second correspondence and determines that the key event does not have a corresponding application program, the strategy control service may cyclically read ActivityInfo using an ANDROID package manager to obtain information that can be used as the identifier of the application program, for example, a package name, an application program name, MainActivity information, and an icon that are of each application program, and then display the information to the user in a form of a list (for example, icon information and application program name information are displayed together in a form of a list) for the user to select, from the list, an identifier of an application program. When the user taps to select an identifier of a specific application program, the strategy control service saves the key number corresponding to the key event and the identifier of the application program that is selected by the user into a configuration file, where a form of the configuration file may be a database, a text document, a preference file, or the like.

Subsequently, when receiving the key event, the strategy control service queries a configuration table, obtains an application program corresponding to the key number corresponding to the key event, and correspondingly starts the application program.

Optionally, when obtaining the control instruction corresponding to the touch control event, the second controller 240 may be further configured to query an application user interface that currently runs at an uppermost layer on the terminal, and detect whether the application user interface corresponds to a third correspondence, where the third correspondence is a correspondence between the touch control event and a control instruction corresponding to the application user interface.

The second controller 240 is configured to obtain the control instruction according to the touch control event and the third correspondence if a detection result is that the application user interface corresponds to the third correspondence.

Further, the second controller 240 is further configured to, before obtaining the control instruction according to the touch control event and the third correspondence, query identifiers of control instructions corresponding to the application user interface, display the queried identifiers of the control instructions as a control instruction identifier list, and establish the third correspondence according to an operation that is selected by the user from the control instruction identifier list.

In addition to being used to trigger a key in a navigation bar and start an application program, the solution shown in this embodiment may be further used to trigger function keys included in application program interfaces. For example, when the terminal is an ANDROID smartphone, in an example in which a function key at a phone program interface of the smartphone is triggered, when the smartphone enters a phone program, keys corresponding to detection electrodes of touch control units may respectively correspond to a function of accessing a dial, a function of accessing a "contact" page, a function of accessing a "collection" page, and the like.

A system open interface releases, to a developer of the application program, touch control events of the keys corresponding to the detection electrodes in the touch control units, and the developer of the application program sets functions, at the application program interfaces, corresponding to the events, that is, the developer sets a corresponding third correspondence for each application program interface.

When the application program is installed, the application program registers with a system using an ANDROIDmanifest.xml, and instructs the system to, when there is the touch control event of the key corresponding to the detection electrode in the touch control unit, report the event to an application layer instead of sending the event to the strategy control service, and the system saves, in the configuration file, a package name of the application program registered with the system.

When there is the touch control event of the key corresponding to the detection electrode in the touch control unit, the Framework layer reads a package name of the application program interface that currently runs at a topmost layer, queries the configuration file using the package name, determines whether the application program interface needs the touch control event, and reports the touch control event as the key event if the application program interface needs the touch control event. The application layer may obtain the event using an onKeyDown callback function, query the third correspondence corresponding to the application program interface that currently runs at the topmost layer, determine the corresponding control instruction according to the queried third correspondence, and implement the instruction. If the application program interface does not need the touch control event, the touch control event is discarded and not processed.

In addition, alternatively, the third correspondence may be specified and established by the user. For example, when the application layer finds, by means of query, that the application program interface that currently runs at the topmost layer does not need the key event, the application layer may query the identifiers of the control instructions corresponding to the application user interface at the topmost layer, display the queried identifiers of the control instructions as the control instruction identifier list, and establish the third correspondence according to the operation that is selected by the user from the control instruction identifier list.

The solution may be applied to software, and in particular to game software. A touch control event (for example, an arrow key) of current game software occurs in a screen area, and tapping by the user may obstruct a sight. According to the foregoing solution, a key in the touch control area of the touchscreen may be transferred outside the touchscreen to prevent the sight of the user from being obstructed by tapping, and improve user experience.

In conclusion, according to the terminal provided in this embodiment of the present disclosure, a detection electrode is disposed outside a touch control area of a touchscreen of the terminal, an induction electrode is disposed in the touch area, and the detection electrode is connected to the induction electrode using a conducting wire. When a user performs an operation on the detection electrode, a capacitance change value of a capacitance node coupled to the induction electrode changes. Therefore, a first controller detects, according to a capacitance change of the capacitance node coupled to the induction electrode, that the detection electrode receives a touch control operation, and generates a corresponding touch control event, a second controller controls the terminal according to the touch control event. The touch control operation performed by the user on the detection electrode disposed outside the touchscreen is identified using an existing capacitance node in the touchscreen, and the terminal is controlled according to the touch control operation. Therefore, by merely occupying a very small space and spending very low costs, a manner in which a user controls a terminal may be further extended, and user experience may be improved.

Figure 3:
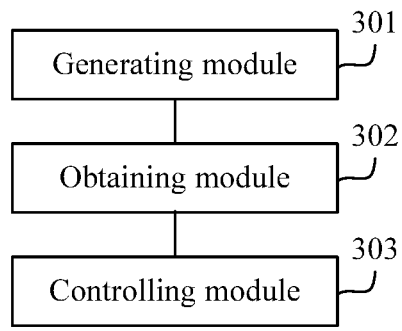
FIG. 3 is an apparatus structural diagram of a terminal control apparatus according to an embodiment of the present disclosure.

FIG. 3 shows an apparatus structural diagram of a terminal control apparatus according to an embodiment of the present disclosure. The terminal control apparatus may be applied to a terminal that includes a touchscreen and at least one touch control unit. The touch control unit includes a detection electrode, an induction electrode, and a conducting wire that connects the detection electrode and the induction electrode. The detection electrode is located outside a touch control area of the touchscreen. The induction electrode is located in the touch control area of the touchscreen, and the induction electrode is coupled to at least one capacitance node in the touchscreen. The terminal may be the terminal shown in FIG. 1 or FIG. 2. The terminal control apparatus may include a generating module 301 configured to when detecting, according to a capacitance change parameter of the at least one capacitance node and a capacitance change parameter of a node neighboring to the at least one capacitance node, that the detection electrode receives a touch control operation, generate a touch control event that is used to indicate the touch control operation, where the capacitance change parameter is used to indicate a capacitance change value of a corresponding capacitance node for a time period, an obtaining module 302 configured to obtain a control instruction corresponding to the touch control event, and a control module 303 configured to control the terminal according to the control instruction.

Both the detection electrode and the induction election are made of conducting materials. When a user performs a touch operation on the detection electrode outside the touchscreen, a charge transfer occurs in the detection electrode, and accordingly, a charge transfer occurs in the induction electrode. When the charge transfer occurs in the induction electrode, a capacitance change value of the capacitance node that is coupled to the induction electrode and in the touchscreen also changes. A first controller connected to the touchscreen scans capacitance change values of all capacitance nodes in the touchscreen, and when detecting that the capacitance node coupled to the induction node changes, the first controller may determine, according to the capacitance change value of the capacitance node coupled to the induction node, the capacitance change value of the capacitance node neighboring to the capacitance node coupled to the induction node, and locations of these capacitance nodes, whether the capacitance changes of these capacitance nodes are capacitance changes caused by touching the detection electrode by the user or capacitance changes caused by touching the touchscreen by the user. If the first controller determines that the capacitance changes of these capacitance nodes are the capacitance changes caused by touching the detection electrode by the user, the first controller generates the touch control event corresponding to the touch control operation performed by the user on the detection electrode, and a second controller may query, according to the touch control event generated by the first controller, the control instruction corresponding to the operation performed by the user, and control the terminal according to the queried control instruction.

In conclusion, the terminal control apparatus provided in this embodiment of the present disclosure generates a touch control event when detecting, according to a capacitance change of a capacitance node coupled to an induction electrode in a touch control unit, that a detection electrode outside a touch control area of a touchscreen receives a touch control operation, and controls a terminal according to the touch control event. The touch control operation performed by a user on the detection electrode disposed outside the touchscreen is identified using an existing capacitance node in the touchscreen, and the terminal is controlled according to the touch control operation. Therefore, by merely occupying a very small space and spending very low costs, a manner in which a user controls a terminal may be further extended, and user experience may be improved.

Figure 4:
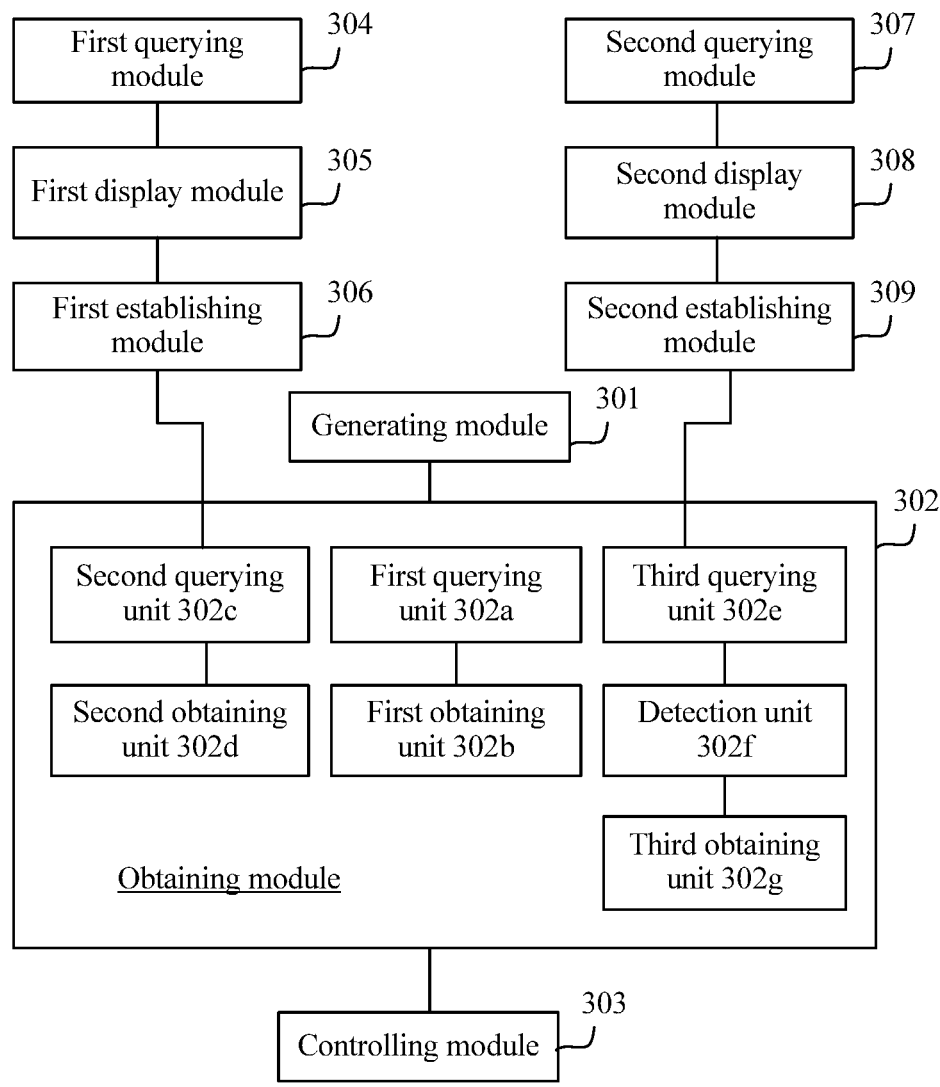
FIG. 4 is an apparatus structural diagram of a terminal control apparatus according to another embodiment of the present disclosure.

To further describe the embodiment shown in the foregoing FIG. 3, refer to FIG. 4, which shows an apparatus structural diagram of a terminal control apparatus according to another embodiment of the present disclosure. The terminal control apparatus may be applied to a terminal that includes a touchscreen and at least one touch control unit. The touch control unit includes a detection electrode, an induction electrode, and a conducting wire that connects the detection electrode and the induction electrode. The detection electrode is located outside a touch control area of the touchscreen. The induction electrode is located in the touch control area of the touchscreen, and the induction electrode is coupled to at least one capacitance node in the touchscreen. The terminal may be the terminal shown in FIG. 1 or FIG. 2. The terminal control apparatus may include a generating module 301 configured to when detecting, according to a capacitance change parameter of the at least one capacitance node and a capacitance change parameter of a node neighboring to the at least one capacitance node, that the detection electrode receives a touch control operation, generate a touch control event that is used to indicate the touch control operation, where the capacitance change parameter is used to indicate a capacitance change value of a corresponding capacitance node for a time period, an obtaining module 302 configured to obtain a control instruction corresponding to the touch control event, and a control module 303 configured to control the terminal according to the control instruction.

Both the detection electrode and the induction election are made of conducting materials. When a user performs a touch operation on the detection electrode outside the touchscreen, a charge transfer occurs in the detection electrode, and accordingly, a charge transfer occurs in the induction electrode. When the charge transfer occurs in the induction electrode, a capacitance change value of the capacitance node that is coupled to the induction electrode and in the touchscreen also changes. A first controller connected to the touchscreen scans capacitance change values of all capacitance nodes in the touchscreen, and when detecting that the capacitance node coupled to the induction node changes, the first controller may determine, according to the capacitance change value of the capacitance node coupled to the induction node, the capacitance change value of the capacitance node neighboring to the capacitance node coupled to the induction node, and locations of these capacitance nodes, whether the capacitance changes of these capacitance nodes are capacitance changes caused by touching the detection electrode by the user or capacitance changes caused by touching the touchscreen by the user. If the first controller determines that the capacitance changes of these capacitance nodes are the capacitance changes caused by touching the detection electrode by the user, the first controller generates the touch control event corresponding to the touch control operation performed by the user on the detection electrode, and a second controller may query, according to the touch control event generated by the first controller, the control instruction corresponding to the operation performed by the user, and control the terminal according to the queried control instruction.

Optionally, the obtaining module 302 includes a first querying unit 302a configured to query a first correspondence between the touch control event and a function key instruction, and a first obtaining unit 302b configured to obtain the function key instruction and use the function key instruction as the control instruction.

When receiving the touch control event generated when the touch control operation is performed on the detection electrode, the central processing unit of the terminal first determines whether the terminal stores the first correspondence between the touch control event and the function key instruction, and obtains the function key instruction and uses the function key instruction as the control instruction if the terminal stores the first correspondence, or discards the touch control event if the terminal does not store the first correspondence.

A function key is a key in a navigation bar at a terminal user interface. In an example in which the terminal is a smartphone, keys in the navigation bar may be a return key, a menu key, a home key, and the like that are at various user interfaces.

A developer may preset the first correspondence between touch control events corresponding to touch control units in the terminal and control instructions (such as an instruction for returning to a previous user interface, an instruction for calling out a menu bar, and an instruction for returning to a main user interface) corresponding to the keys in the navigation bar. After generating the touch control event corresponding to the touch control operation performed by the user on the detection electrode, the touchscreen controller sends the touch control event to the central processing unit, and the central processing unit queries the corresponding control instruction according to the first correspondence and the touch control event.

Optionally, the obtaining module 302 includes a second querying unit 302c configured to query an application program according to a second correspondence between the touch control event and the application program, and a second obtaining unit 302d configured to obtain an instruction for starting the application program and use the instruction as the control instruction.

Further, the controller includes a first querying module 304 configured to query identifiers of application programs on the terminal before the second querying unit 302c queries the application program according to the second correspondence between the touch control event and the application program, a first display module 305 configured to display, as an application program identifier list, the identifiers that are of the application programs and queried by the first querying module 304, and a first establishing module 306 configured to establish the second correspondence according to an operation that is selected by the user from the application program identifier list.

In this embodiment of the present disclosure, the detection electrode in the terminal may be further configured to start a specific application program. When receiving the touch control event corresponding to the detection electrode, the central processing unit may determine whether the terminal stores the second correspondence between the touch control event and the application program, and query, according to the second correspondence, the application program corresponding to the touch control event if the terminal stores the second correspondence, and obtain the instruction for starting the application program, or may discard the touch control event if the terminal does not store the second correspondence, or may trigger a step of defining a second correspondence by the user, query application programs on the terminal, and display the application programs to the user such that the user selects an application program and establishes the second correspondence between the application program and the touch control event.

For example, when the terminal is a smartphone with an ANDROID system, when detecting that the detection electrode in the touch control unit is tapped, the touchscreen controller generates a touch control event including a serial number of a key (such as key 1) corresponding to the touch control unit. After receiving the touch control event, the central processing unit writes the serial number of the key into a register and reports an interruption. When receiving the interruption, a driver layer reads the register, changes a read key value (key 1) to a key event, and reports the key event to a Framework layer. After receiving the key event, the Framework layer sends the key event to a strategy control service. The strategy control service determines, according to the second correspondence, a to-be-started application program, obtains an instruction for starting the application program and uses the instruction as the control instruction, and implements the control instruction.

The second correspondence may be established by means of user definition. For example, when the strategy control service queries the second correspondence and determines that the key event does not have a corresponding application program, the strategy control service may cyclically read ActivityInfo using an ANDROID package manager (PackageManager) to obtain information that can be used as the identifier of the application program, for example, a package name, an application program name, MainActivity information, and an icon that are of each application program, and then display the information to the user in a form of a list (for example, icon information and application program name information are displayed together in a form of a list) for the user to select, from the list, an identifier of an application program. When the user taps to select an identifier of a specific application program, the strategy control service saves the key number corresponding to the key event and the identifier of the application program that is selected by the user into a configuration file, where a form of the configuration file may be a database, a text document, a preference file, or the like.

Subsequently, when receiving the key event, the strategy control service queries a configuration table, obtains an application program corresponding to the key number corresponding to the key event, and correspondingly starts the application program.

Optionally, the obtaining module 302 includes a third querying unit 302e configured to query an application user interface that currently runs at an uppermost layer on the terminal, a detection unit 302f configured to detect whether the application user interface corresponds to a third correspondence, where the third correspondence is a correspondence between the touch control event and a control instruction corresponding to the application user interface, and a third obtaining unit 302g configured to obtain the control instruction according to the touch control event and the third correspondence if a detection result of the detection unit is that the application user interface corresponds to the third correspondence.

Further, the controller includes a second querying module 307 configured to before the third obtaining unit 302e obtains the control instruction according to the touch control event and the third correspondence, query identifiers of control instructions corresponding to the application user interface, a second display module 308 configured to display, as a control instruction identifier list, the identifiers that are of the control instructions and queried by the second querying module 307, and a second establishing module 309 configured to establish the third correspondence according to an operation that is selected by the user from the control instruction identifier list.

In addition to being used to trigger a key in a navigation bar and start an application program, the solution shown in this embodiment may be further used to trigger function keys included in application program interfaces. For example, when the terminal is an ANDROID smartphone, in an example in which a function key at a phone program interface of the smartphone is triggered, when the smartphone enters a phone program, keys corresponding to detection electrodes of touch control units may respectively correspond to a function of accessing a dial, a function of accessing a "contact" page, a function of accessing a "collection" page, and the like.

A system open interface releases, to a developer of the application program, touch control events of the keys corresponding to the detection electrodes in the touch control units, and the developer of the application program sets functions, at the application program interfaces, corresponding to the events, that is, the developer sets a corresponding third correspondence for each application program interface.

When the application program is installed, the application program registers with a system using an ANDROIDManifest.xml, and instructs the system to when there is the touch control event of the key corresponding to the detection electrode in the touch control unit, report the event to an application layer instead of sending the event to the strategy control service, and the system saves, in the configuration file, a package name of the application program registered with the system.

When there is the touch control event of the key corresponding to the detection electrode in the touch control unit, the Framework layer reads a package name of the application program interface that currently runs at a topmost layer, queries the configuration file using the package name, determines whether the application program interface needs the touch control event, and reports the touch control event as the key event if the application program interface needs the touch control event. The application layer may obtain the event using an onKeyDown callback function, query the third correspondence corresponding to the application program interface that currently runs at the topmost layer, determine the corresponding control instruction according to the queried third correspondence, and implement the instruction. If the application program interface does not need the touch control event, the touch control event is discarded and not processed.

In addition, alternatively, the third correspondence may be specified and established by the user. For example, when the application layer finds, by means of query, that the application program interface that currently runs at the topmost layer does not need the key event, the application layer may query the identifiers of the control instructions corresponding to the application user interface at the topmost layer, display the queried identifiers of the control instructions as the control instruction identifier list, and establish the third correspondence according to the operation that is selected by the user from the control instruction identifier list.

The solution may be applied to software, and in particular to game software. A taping event (for example, an arrow key) of current game software occurs in a screen area, and tapping by the user may obstruct a sight. According to the foregoing solution, a key in the touch control area of the touchscreen may be transferred outside the touchscreen to prevent the sight of the user from being obstructed by tapping, and improve user experience.

In conclusion, the terminal control apparatus provided in this embodiment of the present disclosure generates a touch control event when detecting, according to a capacitance change of a capacitance node coupled to an induction electrode in a touch control unit, that a detection electrode outside a touch control area of a touchscreen receives a touch control operation, and controls a terminal according to the touch control event. The touch control operation performed by a user on the detection electrode disposed outside the touchscreen is identified using an existing capacitance node in the touchscreen, and the terminal is controlled according to the touch control operation. Therefore, by merely occupying a very small space and spending very low costs, a manner in which a user controls a terminal may be further extended, and user experience may be improved.

Figure 5:
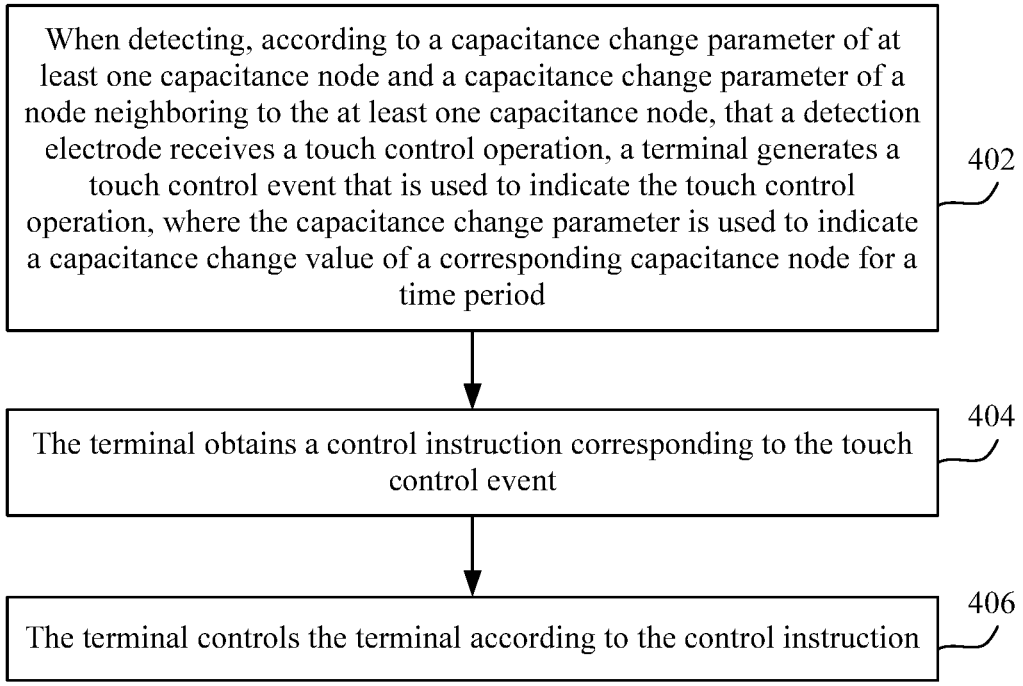
FIG. 5 is a method flowchart of a terminal control method according to an embodiment of the present disclosure.

FIG. 5 shows a method flowchart of a terminal control method according to an embodiment of the present disclosure. The method may be applied to a terminal that includes a touchscreen and at least one touch control unit. The touch control unit includes a detection electrode, an induction electrode, and a conducting wire that connects the detection electrode and the induction electrode. The detection electrode is located outside a touch control area of the touchscreen. The induction electrode is located in the touch control area of the touchscreen, and the induction electrode is coupled to at least one capacitance node in the touchscreen. The terminal may be the terminal shown in FIG. 1 or FIG. 2. The method may include the following steps:

Step 402: When detecting, according to a capacitance change parameter of the at least one capacitance node and a capacitance change parameter of a node neighboring to the at least one capacitance node, that the detection electrode receives a touch control operation, the terminal generates a touch control event that is used to indicate the touch control operation, where the capacitance change parameter is used to indicate a capacitance change value of a corresponding capacitance node for a time period.

Step 404: The terminal obtains a control instruction corresponding to the touch control event.

Step 406: The terminal controls the terminal according to the control instruction.

Both the detection electrode and the induction election are made of conducting materials. When a user performs a touch operation on the detection electrode outside the touchscreen, a charge transfer occurs in the detection electrode, and accordingly, a charge transfer occurs in the induction electrode. When the charge transfer occurs in the induction electrode, a capacitance change value of the capacitance node that is coupled to the induction electrode and in the touchscreen also changes. A first controller connected to the touchscreen scans capacitance change values of all capacitance nodes in the touchscreen, and when detecting that the capacitance node coupled to the induction node changes, the first controller may determine, according to the capacitance change value of the capacitance node coupled to the induction node, the capacitance change value of the capacitance node neighboring to the capacitance node coupled to the induction node, and locations of these capacitance nodes, whether the capacitance changes of these capacitance nodes are capacitance changes caused by touching the detection electrode by the user or capacitance changes caused by touching the touchscreen by the user. If the first controller determines that the capacitance changes of these capacitance nodes are the capacitance changes caused by touching the detection electrode by the user, the first controller generates the touch control event corresponding to the touch control operation performed by the user on the detection electrode, and a second controller may query, according to the touch control event generated by the first controller, the control instruction corresponding to the operation performed by the user, and control the terminal according to the queried control instruction.

In conclusion, according to the terminal control method provided in this embodiment of the present disclosure, when it is detected, according to a capacitance change of a capacitance node coupled to an induction electrode in a touch control unit, that a detection electrode outside a touch control area of a touchscreen receives a touch control operation, a touch control event is generated, and the terminal is controlled according to the touch control event. The touch control operation performed by a user on the detection electrode disposed outside the touchscreen is identified using an existing capacitance node in the touchscreen, and the terminal is controlled according to the touch control operation. Therefore, by merely occupying a very small space and spending very low costs, a manner in which a user controls a terminal may be further extended, and user experience may be improved.

Figure 6:
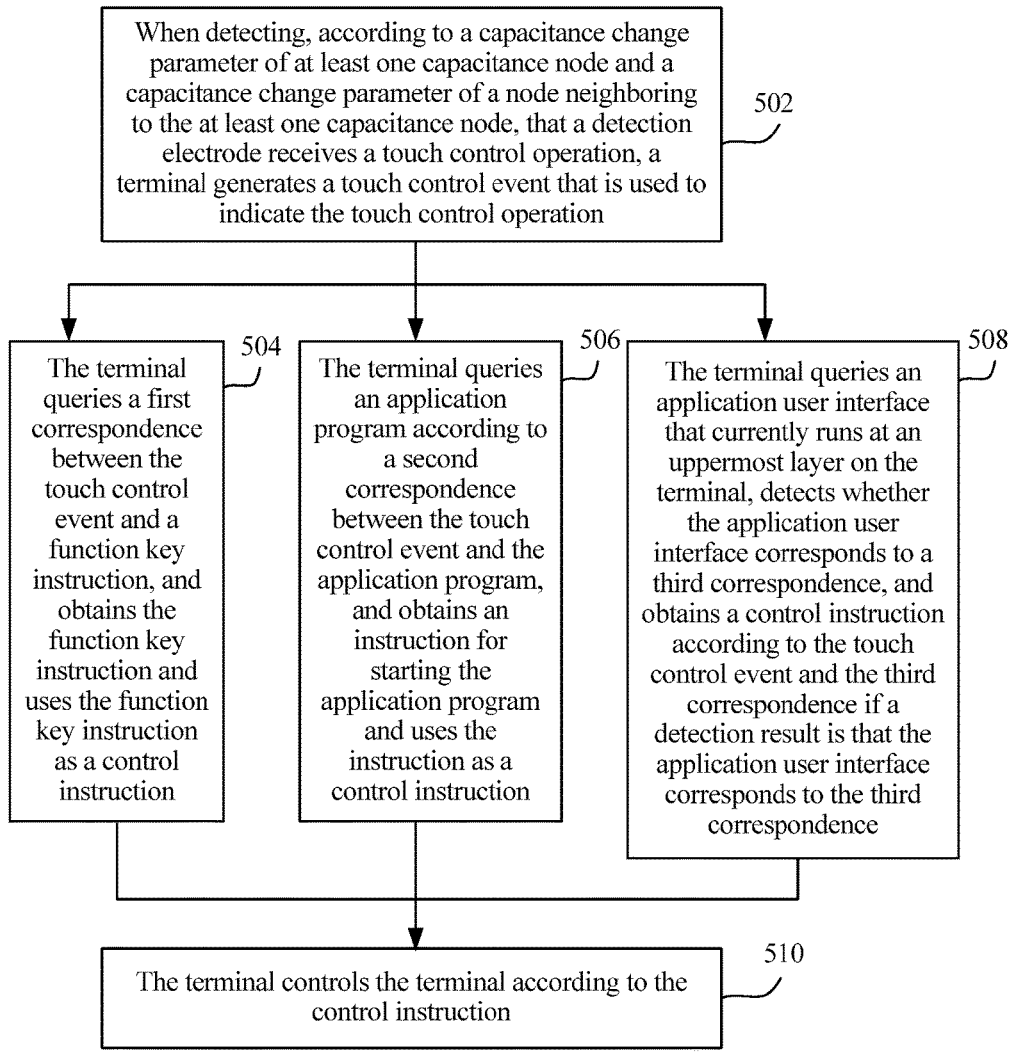
FIG. 6 is a method flowchart of a terminal control method according to another embodiment of the present disclosure.

To further describe the terminal control method shown in the foregoing FIG. 5, refer to FIG. 6, which shows a method flowchart of a terminal control method according to another embodiment of the present disclosure. The method may be applied to a terminal that includes a touchscreen and at least one touch control unit. The touch control unit includes a detection electrode, an induction electrode, and a conducting wire that connects the detection electrode and the induction electrode. The detection electrode is located outside a touch control area of the touchscreen. The induction electrode is located in the touch control area of the touchscreen, and the induction electrode is coupled to at least one capacitance node in the touchscreen. The terminal may be the terminal shown in FIG. 1 or FIG. 2. The method may include the following steps:

Step 502: When detecting, according to a capacitance change parameter of the at least one capacitance node and a capacitance change parameter of a node neighboring to the at least one capacitance node, that the detection electrode receives a touch control operation, the terminal generates a touch control event that is used to indicate the touch control operation.

The capacitance change parameter is used to indicate a capacitance change value of a corresponding capacitance node for a time period.

Both the detection electrode and the induction election are made of conducting materials. When a user performs a touch operation on the detection electrode outside the touchscreen, a charge transfer occurs in the detection electrode, and accordingly, a charge transfer occurs in the induction electrode. When the charge transfer occurs in the induction electrode, a capacitance change value of the capacitance node that is coupled to the induction electrode and in the touchscreen also changes. A first controller connected to the touchscreen scans capacitance change values of all capacitance nodes in the touchscreen, and when detecting that the capacitance node coupled to the induction node changes, the first controller may determine, according to the capacitance change value of the capacitance node coupled to the induction node, the capacitance change value of the capacitance node neighboring to the capacitance node coupled to the induction node, and locations of these capacitance nodes, whether the capacitance changes of these capacitance nodes are capacitance changes caused by touching the detection electrode by the user or capacitance changes caused by touching the touchscreen by the user. If the first controller determines that the capacitance changes of these capacitance nodes are the capacitance changes caused by touching the detection electrode by the user, the first controller generates the touch control event corresponding to the touch control operation performed by the user on the detection electrode.

Step 504: The terminal queries a first correspondence between the touch control event and a function key instruction, and obtains the function key instruction and uses the function key instruction as a control instruction.

When receiving the touch control event generated when the touch control operation is performed on the detection electrode, the central processing unit of the terminal first determines whether the terminal stores the first correspondence between the touch control event and the function key instruction, and obtains the function key instruction and uses the function key instruction as the control instruction if the terminal stores the first correspondence, or discards the touch control event if the terminal does not store the first correspondence.

A function key is a key in a navigation bar at a terminal user interface. In an example in which the terminal is a smartphone, keys in the navigation bar may be a return key, a menu key, a home key, and the like that are at various user interfaces.

A developer may preset the first correspondence between touch control events corresponding to touch control units in the terminal and control instructions (such as an instruction for returning to a previous user interface, an instruction for calling out a menu bar, and an instruction for returning to a main user interface) corresponding to the keys in the navigation bar. After generating the touch control event corresponding to the touch control operation performed by the user on the detection electrode, the touchscreen controller sends the touch control event to the central processing unit, and the central processing unit queries the corresponding control instruction according to the first correspondence and the touch control event.

Step 506: The terminal queries an application program according to a second correspondence between the touch control event and the application program, and obtains an instruction for starting the application program and uses the instruction as a control instruction.

Before querying the application program according to the second correspondence between the touch control event and the application program, the terminal queries identifiers of application programs on the terminal, displays the queried identifiers of the application programs as an application program identifier list, and establishes the second correspondence according to an operation that is selected by a user from the application program identifier list.

In this embodiment of the present disclosure, the detection electrode in the terminal may be further configured to start a specific application program. When receiving the touch control event corresponding to the detection electrode, the central processing unit may determine whether the terminal stores the second correspondence between the touch control event and the application program, and query, according to the second correspondence, the application program corresponding to the touch control event if the terminal stores the second correspondence, and obtain the instruction for starting the application program, or may discard the touch control event if the terminal does not store the second correspondence, or may trigger a step of defining a second correspondence by the user, query application programs on the terminal, and display the application programs to the user such that the user selects an application program, and establishes the second correspondence between the application program and the touch control event.

For example, when the terminal is a smartphone with an ANDROID system, when detecting that the detection electrode in the touch control unit is tapped, the touchscreen controller generates a touch control event including a serial number of a key (such as key 1) corresponding to the touch control unit. After receiving the touch control event, the central processing unit writes the serial number of the key into a register and reports an interruption. When receiving the interruption, a driver layer reads the register, changes a read key value (key 1) to a key event, and reports the key event to a Framework layer. After receiving the key event, the Framework layer sends the key event to a strategy control service. The strategy control service determines a to-be-started application program according to the second correspondence, and obtains an instruction for starting the application program and uses the instruction as the control instruction.

The second correspondence may be established by means of user definition When the strategy control service queries the second correspondence and determines that the key event does not have a corresponding application program, the strategy control service may cyclically read ActivityInfo using an ANDROID package manager to obtain information that can be used as the identifier of the application program, for example, a package name, an application program name, MainActivity information, and an icon that are of each application program, and then display the information to the user in a form of a list (for example, icon information and application program name information are displayed together in a form of a list) for the user to select, from the list, an identifier of an application program. When the user taps to select an identifier of a specific application program, the strategy control service saves the key number corresponding to the key event and the identifier of the application program that is selected by the user into a configuration file, where a form of the configuration file may be a database, a text document, a preference file, or the like.

Subsequently, when receiving the key event, the strategy control service queries a configuration table, obtains an application program corresponding to the key number corresponding to the key event, and obtains the instruction for starting the application program.

Step 508: The terminal queries an application user interface that currently runs at an uppermost layer on the terminal, detects whether the application user interface corresponds to a third correspondence, and obtains a control instruction according to the touch control event and the third correspondence if a detection result is that the application user interface corresponds to the third correspondence.

The third correspondence is a correspondence between the touch control event and a control instruction corresponding to the application user interface.

Before obtaining the control instruction according to the touch control event and the third correspondence, the terminal queries identifiers of control instructions corresponding to the application user interface, displays the queried identifier of the control instruction as a control instruction identifier list, and establishes the third correspondence according to an operation that is selected by the user from the control instruction identifier list.

In addition to being used to trigger a key in a navigation bar and start an application program, the solution shown in this embodiment may be further used to trigger function keys included in application program interfaces. For example, when the terminal is an ANDROID smartphone, in an example in which a function key at a phone program interface of the smartphone is triggered, when the smartphone enters a phone program, keys corresponding to detection electrodes of touch control units may respectively correspond to a function of accessing a dial, a function of accessing a "contact" page, a function of accessing a "collection" page, and the like. An implementation manner may be as follows A system open interface releases, to a developer of the application program, touch control events of the keys corresponding to the detection electrodes in the touch control units, and the developer of the application program sets functions, at the application program interfaces, corresponding to the events, that is, the developer sets a corresponding third correspondence for each application program interface.

When the application program is installed, the application program registers with a system using an ANDROIDManifest.xml, and instructs the system to when there is the touch control event of the key corresponding to the detection electrode in the touch control unit, report the event to an application layer instead of sending the event to the strategy control service, and the system saves, in the configuration file, a package name of the application program registered with the system.

When there is the touch control event of the key corresponding to the detection electrode in the touch control unit, the Framework layer reads a package name of the application program interface that currently runs at a topmost layer, queries the configuration file using the package name, determines whether the application program interface needs the touch control event, and reports the touch control event as the key event if the application program interface needs the touch control event. The application layer may obtain the event using an onKeyDown callback function, query the third correspondence corresponding to the application program interface that currently runs at the topmost layer, and determine the corresponding control instruction according to the queried third correspondence. If the application program interface does not need the touch control event, the touch control event is discarded and not processed.

In addition, alternatively, the third correspondence may be specified and established by the user. For example, when the application layer finds, by means of query, that the application program interface that currently runs at the topmost layer does not need the key event, the application layer may query the identifiers of the control instructions corresponding to the application user interface at the topmost layer, display the queried identifiers of the control instructions as the control instruction identifier list, and establish the third correspondence according to the operation that is selected by the user from the control instruction identifier list.

The solution may be applied to software, and in particular to game software. A touch control event (for example, an arrow key) of current game software occurs in a screen area, and tapping by the user may obstruct a sight. According to the foregoing solution, a key in the touch control area of the touchscreen may be transferred outside the touchscreen to prevent the sight of the user from being obstructed by tapping, and improve user experience.

Step 510: The terminal controls the terminal according to the control instruction.

In conclusion, according to the terminal control method provided in this embodiment of the present disclosure, when it is detected, according to a capacitance change of a capacitance node coupled to an induction electrode in a touch control unit, that a detection electrode outside a touch control area of a touchscreen receives a touch control operation, a touch control event is generated, and the terminal is controlled according to the touch control event. The touch control operation performed by a user on the detection electrode disposed outside the touchscreen is identified using an existing capacitance node in the touchscreen, and the terminal is controlled according to the touch control operation. Therefore, by merely occupying a very small space and spending very low costs, a manner in which a user controls a terminal may be further extended, and user experience may be improved.

A person of ordinary skill in the art may understand that all or some of the steps of the embodiments may be implemented by hardware or a program instructing related hardware. The program may be stored in a computer-readable storage medium. The storage medium may include a read-only memory, a magnetic disk, an optical disc, or the like.

The foregoing descriptions are merely exemplary embodiments of the present disclosure, but are not intended to limit the present disclosure. Any modification, equivalent replacement, and improvement made without departing from the spirit and principle of the present disclosure shall fall within the protection scope of the present disclosure.

What is claimed is:

1. A terminal, comprising:
   a touchscreen;
   a detection electrode located outside a touch control area of the touchscreen;
   an induction electrode located in the touch control area of the touchscreen;
   a conducting wire that connects the detection electrode and the induction electrode;
   a first controller; and
   a second controller,
   wherein the induction electrode is coupled to at least one capacitance node in the touchscreen,
   wherein the first controller is separately connected to the touchscreen and the second controller,
   wherein the first controller is configured to:
      generate a touch control event that is used to indicate a touch control operation when detecting that the detection electrode receives the touch control operation according to a capacitance change parameter of the at least one capacitance node and a capacitance change parameter of a node neighboring to the at least one capacitance node; and send the touch control event to the second controller, wherein the capacitance change parameters are used to indicate a capacitance change value of a corresponding capacitance node for a time period, and wherein the second controller is configured to:
receive the touch control event;
obtain a control instruction corresponding to the touch control event; and
control the terminal according to the control instruction.

2. The terminal according to claim 1, wherein the second controller is further configured to:
query a first correspondence between the touch control event and a function key instruction; obtain the function key instruction; and
use the function key instruction as the control instruction.

3. The terminal according to claim 1, wherein the second controller is further configured to:
query an application program according to a second correspondence between the touch control event and the application program; and
obtain an instruction for starting the application program and use the instruction as the control instruction.

4. The terminal according to claim 3, wherein the second controller is further configured to:
query identifiers of application programs on the terminal before querying the application program according to the second correspondence between the touch control event and the application program;
display the queried identifiers of the application programs as an application program identifier list; and
establish the second correspondence according to an operation that is selected by a user from the application program identifier list.

5. The terminal according to claim 1, wherein the second controller is further configured to:
query an application user interface that currently runs at an uppermost layer on the terminal;
detect whether the application user interface corresponds to a third correspondence, wherein the third correspondence is a correspondence between the touch control event and a control instruction corresponding to the application user interface; and
obtain the control instruction according to the touch control event and the third correspondence when a detection result is that the application user interface corresponds to the third correspondence.

6. The terminal according to claim 5, wherein the second controller is further configured to:
query identifiers of control instructions corresponding to the application user interface before obtaining the control instruction according to the touch control event and the third correspondence;
display the queried identifiers of the control instructions as a control instruction identifier list; and
establish the third correspondence according to an operation that is selected by a user from the control instruction identifier list.

7. The terminal according to claim 1, wherein the detection electrode, induction electrode, and conducting wire are disposed in a screen protector that is attached to an upper surface of the touchscreen.

8. The terminal according to claim 1, wherein the detection electrode, induction electrode, and conducting wire are disposed in the touchscreen.

9. A terminal control method, applied to a terminal that comprises a touchscreen, a detection electrode, an induction electrode, and a conducting wire that connects the detection electrode and the induction electrode, wherein the detection electrode is located outside a touch control area of the touchscreen, wherein the induction electrode is located in the touch control area of the touchscreen, wherein the induction electrode is coupled to at least one capacitance node in the touchscreen, and wherein the method comprises:
generating, by the terminal, a touch control event that is used to indicate a touch control operation when detecting that the detection electrode receives the touch control operation according to a capacitance change parameter of the at least one capacitance node and a capacitance change parameter of a node neighboring to the at least one capacitance node, wherein the capacitance change parameters are used to indicate a capacitance change value of a corresponding capacitance node for a time period;
obtaining, by the terminal, a control instruction corresponding to the touch control event; and
controlling, by the terminal, the terminal according to the control instruction.

10. The method according to claim 9, wherein obtaining, by the terminal, the control instruction corresponding to the touch control event comprises:
querying, by the terminal, a first correspondence between the touch control event and a function key instruction; and
obtaining, by the terminal, the function key instruction and using the function key instruction as the control instruction.

11. The method according to claim 9, wherein obtaining, by the terminal, the control instruction corresponding to the touch control event comprises:
querying, by the terminal, an application program according to a second correspondence between the touch control event and the application program; and
obtaining, by the terminal, an instruction for starting the application program and using the instruction as the control instruction.

12. The method according to claim 11, wherein before querying the application program according to the second correspondence between the touch control event and the application program, the method further comprises:
querying, by the terminal, identifiers of application programs on the terminal;
displaying, by the terminal, the queried identifiers of the application programs as an application program identifier list; and
establishing, by the terminal, the second correspondence according to an operation that is selected by a user from the application program identifier list.

13. The method according to claim 9, wherein obtaining, by the terminal, the control instruction corresponding to the touch control event comprises:
querying, by the terminal, an application user interface that currently runs at an uppermost layer on the terminal;
detecting, by the terminal, whether the application user interface corresponds to a third correspondence, wherein the third correspondence is a correspondence between the touch control event and a control instruction corresponding to the application user interface; and obtaining, by the terminal, the control instruction according to the touch control event and the third correspondence when a detection result is that the application user interface corresponds to the third correspondence.

14. The method according to claim 13, wherein before obtaining the control instruction according to the touch control event and the third correspondence, the method further comprises:
- querying, by the terminal, identifiers of control instructions corresponding to the application user interface;
- displaying, by the terminal, the queried identifiers of the control instructions as a control instruction identifier list; and
- establishing, by the terminal, the third correspondence according to an operation that is selected by a user from the control instruction identifier list.

* * * * *